(12) United States Patent
Chen

(10) Patent No.: US 10,809,805 B2
(45) Date of Patent: *Oct. 20, 2020

(54) DAMPENING MECHANICAL MODES OF A HAPTIC ACTUATOR USING A DELAY

(71) Applicant: Apple Inc., Cupertino, CA (US)

(72) Inventor: Denis G. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,100

(22) Filed: Apr. 22, 2019

(65) Prior Publication Data

US 2019/0250713 A1 Aug. 15, 2019

Related U.S. Application Data

(63) Continuation of application No. 15/364,822, filed on Nov. 30, 2016, now Pat. No. 10,268,272.

(60) Provisional application No. 62/316,477, filed on Mar. 31, 2016, provisional application No. 62/326,697, filed on Apr. 22, 2016.

(51) Int. Cl.
*G08B 6/00* (2006.01)
*G06F 3/01* (2006.01)

(52) U.S. Cl.
CPC .............. *G06F 3/016* (2013.01); *G08B 6/00* (2013.01)

(58) Field of Classification Search
CPC .................................. G06F 3/016; G08B 6/00
USPC ...................................................... 340/407.2
See application file for complete search history.

(56) References Cited

U.S. PATENT DOCUMENTS

| 3,001,049 | A | 9/1961 | Didier |
| 3,390,287 | A | 6/1968 | Sonderegger |
| 3,419,739 | A | 12/1968 | Clements |
| 4,236,132 | A | 11/1980 | Zissimopoulos |
| 4,412,148 | A | 10/1983 | Klicker et al. |
| 4,414,984 | A | 11/1983 | Zarudiansky |
| 4,490,815 | A | 12/1984 | Umehara et al. |
| 4,695,813 | A | 9/1987 | Nobutoki et al. |
| 4,975,616 | A | 12/1990 | Park |
| 5,010,772 | A | 4/1991 | Bourland |

(Continued)

FOREIGN PATENT DOCUMENTS

| AU | 2015100710 | 7/2015 |
| AU | 2016100399 | 5/2016 |

(Continued)

OTHER PUBLICATIONS

U.S. Appl. No. 16/259,645, filed Jan. 28, 2019, Miller et al.

(Continued)

*Primary Examiner* — Zhen Y Wu
(74) *Attorney, Agent, or Firm* — Brownstein Hyatt Farber Schreck, LLP

(57) ABSTRACT

Described herein is a method for determining a higher order resonance mode frequency of a haptic actuator for an electronic device. The higher order resonance mode frequency may correspond to a frequency in which a mass of the haptic actuator exhibits undesired movement. The movement may cause the mass to collide or otherwise impact an enclosure of the haptic actuator. Once the higher order resonance mode frequency is determined, a delay or a polarity inversion may be added to one or more of a series of input waveforms to suppress or brake the undesired movement.

18 Claims, 8 Drawing Sheets

(56) References Cited

U.S. PATENT DOCUMENTS

| | | | |
|---|---|---|---|
| 5,245,734 A | 9/1993 | Issartel | |
| 5,283,408 A | 2/1994 | Chen | |
| 5,293,161 A | 3/1994 | MacDonald et al. | |
| 5,317,221 A | 5/1994 | Kubo et al. | |
| 5,365,140 A | 11/1994 | Ohya et al. | |
| 5,434,549 A | 7/1995 | Hirabayashi et al. | |
| 5,436,622 A | 7/1995 | Gutman et al. | |
| 5,510,584 A | 4/1996 | Norris | |
| 5,510,783 A | 4/1996 | Findlater et al. | |
| 5,513,100 A | 4/1996 | Parker et al. | |
| 5,587,875 A | 12/1996 | Sellers | |
| 5,590,020 A | 12/1996 | Sellers | |
| 5,602,715 A | 2/1997 | Lempicki et al. | |
| 5,619,005 A | 4/1997 | Shibukawa et al. | |
| 5,621,610 A | 4/1997 | Moore et al. | |
| 5,625,532 A | 4/1997 | Sellers | |
| 5,629,578 A | 5/1997 | Winzer et al. | |
| 5,635,928 A | 6/1997 | Takagi et al. | |
| 5,718,418 A | 2/1998 | Gugsch | |
| 5,739,759 A | 4/1998 | Nakazawa et al. | |
| 5,742,242 A | 4/1998 | Sellers | |
| 5,783,765 A | 7/1998 | Muramatsu | |
| 5,793,605 A | 8/1998 | Sellers | |
| 5,812,116 A | 9/1998 | Malhi | |
| 5,813,142 A | 9/1998 | Demon | |
| 5,818,149 A | 10/1998 | Safari et al. | |
| 5,896,076 A | 4/1999 | Van Namen | |
| 5,907,199 A | 5/1999 | Miller | |
| 5,951,908 A | 9/1999 | Cui et al. | |
| 5,959,613 A | 9/1999 | Rosenberg et al. | |
| 5,973,441 A | 10/1999 | Lo et al. | |
| 5,982,304 A | 11/1999 | Selker et al. | |
| 5,982,612 A | 11/1999 | Roylance | |
| 5,995,026 A | 11/1999 | Sellers | |
| 5,999,084 A | 12/1999 | Armstrong | |
| 6,035,257 A * | 3/2000 | Epperson | G01V 1/159 702/17 |
| 6,069,433 A | 5/2000 | Lazarus et al. | |
| 6,078,308 A | 6/2000 | Rosenberg et al. | |
| 6,104,947 A | 8/2000 | Heikkila et al. | |
| 6,127,756 A | 10/2000 | Iwaki | |
| 6,135,886 A | 10/2000 | Armstrong | |
| 6,198,206 B1 | 3/2001 | Saarmaa | |
| 6,218,966 B1 | 4/2001 | Goodwin | |
| 6,219,033 B1 | 4/2001 | Rosenberg | |
| 6,220,550 B1 | 4/2001 | McKillip, Jr. | |
| 6,222,525 B1 | 4/2001 | Armstrong | |
| 6,252,336 B1 | 6/2001 | Hall | |
| 6,342,880 B2 | 1/2002 | Rosenberg et al. | |
| 6,351,205 B1 | 2/2002 | Armstrong | |
| 6,373,465 B2 | 4/2002 | Jolly et al. | |
| 6,408,187 B1 | 6/2002 | Merriam | |
| 6,411,276 B1 | 6/2002 | Braun et al. | |
| 6,429,849 B1 | 8/2002 | An | |
| 6,437,485 B1 | 8/2002 | Johansson | |
| 6,438,393 B1 | 8/2002 | Surronen | |
| 6,444,928 B2 | 9/2002 | Okamoto et al. | |
| 6,455,973 B1 | 9/2002 | Ineson | |
| 6,465,921 B1 | 10/2002 | Horng | |
| 6,552,404 B1 | 4/2003 | Hynes | |
| 6,552,471 B1 | 4/2003 | Chandran et al. | |
| 6,557,072 B2 | 4/2003 | Osborn | |
| 6,642,857 B1 | 11/2003 | Schediwy | |
| 6,693,626 B1 | 2/2004 | Rosenberg | |
| 6,717,573 B1 | 4/2004 | Shahoian et al. | |
| 6,747,400 B2 | 6/2004 | Maichl et al. | |
| 6,809,462 B2 | 10/2004 | Pelrine et al. | |
| 6,809,727 B2 | 10/2004 | Piot et al. | |
| 6,864,877 B2 | 3/2005 | Braun et al. | |
| 6,906,697 B2 | 6/2005 | Rosenberg | |
| 6,906,700 B1 | 6/2005 | Armstrong | |
| 6,906,703 B2 | 6/2005 | Vablais et al. | |
| 6,952,203 B2 | 10/2005 | Banerjee et al. | |
| 6,954,657 B2 | 10/2005 | Bork et al. | |
| 6,963,762 B2 | 11/2005 | Kaaresoja et al. | |
| 6,965,189 B2 | 11/2005 | Menzel | |
| 6,995,752 B2 | 2/2006 | Lu | |
| 7,005,811 B2 | 2/2006 | Wakuda et al. | |
| 7,016,707 B2 | 3/2006 | Fujisawa et al. | |
| 7,022,927 B2 | 4/2006 | Hsu | |
| 7,023,112 B2 | 4/2006 | Miyamoto et al. | |
| 7,081,701 B2 | 7/2006 | Yoon et al. | |
| 7,091,948 B2 | 8/2006 | Chang et al. | |
| 7,121,147 B2 | 10/2006 | Okada | |
| 7,123,948 B2 | 10/2006 | Nielsen | |
| 7,130,664 B1 | 10/2006 | Williams | |
| 7,136,045 B2 | 11/2006 | Rosenberg et al. | |
| 7,158,122 B2 | 1/2007 | Roberts | |
| 7,161,580 B2 | 1/2007 | Bailey et al. | |
| 7,162,928 B2 | 1/2007 | Shank et al. | |
| 7,170,498 B2 | 1/2007 | Huang | |
| 7,176,906 B2 | 2/2007 | Williams et al. | |
| 7,180,500 B2 | 2/2007 | Marvit et al. | |
| 7,182,691 B1 | 2/2007 | Schena | |
| 7,194,645 B2 | 3/2007 | Bieswanger et al. | |
| 7,205,978 B2 | 4/2007 | Poupyrev | |
| 7,217,891 B2 | 5/2007 | Fischer et al. | |
| 7,218,310 B2 | 5/2007 | Tierling et al. | |
| 7,219,561 B2 | 5/2007 | Okada | |
| 7,253,350 B2 | 8/2007 | Noro et al. | |
| 7,269,484 B2 | 9/2007 | Hein | |
| 7,333,604 B2 | 2/2008 | Zernovizky et al. | |
| 7,334,350 B2 | 2/2008 | Ellis | |
| 7,348,968 B2 | 3/2008 | Dawson | |
| 7,382,357 B2 | 6/2008 | Panotopoulos et al. | |
| 7,388,741 B2 | 6/2008 | Konuma et al. | |
| 7,392,066 B2 | 6/2008 | Hapamas | |
| 7,423,631 B2 | 9/2008 | Shahoian et al. | |
| 7,446,752 B2 | 11/2008 | Goldenberg et al. | |
| 7,469,155 B2 | 12/2008 | Chu | |
| 7,469,595 B2 | 12/2008 | Kessler et al. | |
| 7,471,033 B2 | 12/2008 | Thiesen et al. | |
| 7,495,358 B2 | 2/2009 | Kobayashi et al. | |
| 7,508,382 B2 | 3/2009 | Denoue et al. | |
| 7,561,142 B2 | 7/2009 | Shahoian et al. | |
| 7,562,468 B2 | 7/2009 | Ellis | |
| 7,569,086 B2 | 8/2009 | Chandran | |
| 7,575,368 B2 | 8/2009 | Guillaume | |
| 7,586,220 B2 | 9/2009 | Roberts | |
| 7,619,498 B2 | 11/2009 | Miura | |
| 7,639,232 B2 * | 12/2009 | Grant | B06B 1/0215 345/156 |
| 7,641,618 B2 | 1/2010 | Noda et al. | |
| 7,647,196 B2 | 1/2010 | Kahn et al. | |
| 7,649,305 B2 | 1/2010 | Priya et al. | |
| 7,675,253 B2 | 3/2010 | Dorel | |
| 7,675,414 B2 | 3/2010 | Ray | |
| 7,679,611 B2 | 3/2010 | Schena | |
| 7,707,742 B2 | 5/2010 | Ellis | |
| 7,710,399 B2 | 5/2010 | Bruneau et al. | |
| 7,732,951 B2 | 6/2010 | Mukaide | |
| 7,737,828 B2 | 6/2010 | Yang et al. | |
| 7,742,036 B2 | 6/2010 | Grant et al. | |
| 7,788,032 B2 | 8/2010 | Moloney | |
| 7,793,429 B2 | 9/2010 | Ellis | |
| 7,793,430 B2 | 9/2010 | Ellis | |
| 7,798,982 B2 | 9/2010 | Zets et al. | |
| 7,868,489 B2 | 1/2011 | Amemiya et al. | |
| 7,886,621 B2 | 2/2011 | Smith et al. | |
| 7,888,892 B2 | 2/2011 | McReynolds et al. | |
| 7,893,922 B2 | 2/2011 | Klinghult et al. | |
| 7,919,945 B2 | 4/2011 | Houston et al. | |
| 7,929,382 B2 | 4/2011 | Yamazaki | |
| 7,946,483 B2 | 5/2011 | Miller et al. | |
| 7,952,261 B2 | 5/2011 | Lipton et al. | |
| 7,952,566 B2 | 5/2011 | Poupyrev et al. | |
| 7,956,770 B2 | 6/2011 | Klinghult et al. | |
| 7,961,909 B2 | 6/2011 | Mandella et al. | |
| 8,018,105 B2 | 9/2011 | Erixon et al. | |
| 8,031,172 B2 | 10/2011 | Kruse et al. | |
| 8,044,940 B2 | 10/2011 | Narusawa | |
| 8,069,881 B1 | 12/2011 | Cunha | |
| 8,072,418 B2 | 12/2011 | Crawford et al. | |
| 8,077,145 B2 | 12/2011 | Rosenberg et al. | |

(56) References Cited

U.S. PATENT DOCUMENTS

| | | |
|---|---|---|
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Berta et al. |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 * | 8/2012 | Bae ................... H02P 25/032 310/15 |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,373,549 B2 | 2/2013 | Fadell et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,388,346 B2 | 3/2013 | Rantala et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,405,618 B2 | 3/2013 | Colgate et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,593,409 B1 | 11/2013 | Heubel |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Burrough et al. |
| 8,710,966 B2 | 4/2014 | Hill |
| 8,717,309 B2 | 5/2014 | Almalki |
| 8,723,813 B2 | 5/2014 | Park et al. |
| 8,735,755 B2 | 5/2014 | Peterson et al. |
| 8,760,273 B2 | 6/2014 | Casparian et al. |
| 8,760,413 B2 | 6/2014 | Peterson et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,984 B2 | 8/2015 | Heubel et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,628 B2 | 9/2016 | Tan et al. |
| 9,448,713 B2 | 9/2016 | Cruz-Hernandez et al. |
| 9,449,476 B2 | 9/2016 | Lynn |
| 9,452,268 B2 | 9/2016 | Badaye et al. |

(56) References Cited

U.S. PATENT DOCUMENTS

| | | | |
|---|---|---|---|
| 9,454,239 B2 | 9/2016 | Elias et al. |
| 9,467,033 B2 | 10/2016 | Jun et al. |
| 9,468,846 B2 | 10/2016 | Terrell et al. |
| 9,471,172 B2 | 10/2016 | Sirois |
| 9,477,342 B2 | 10/2016 | Daverman et al. |
| 9,480,947 B2 | 11/2016 | Jiang et al. |
| 9,501,912 B1 | 11/2016 | Havskjold et al. |
| 9,542,028 B2 | 1/2017 | Filiz et al. |
| 9,544,694 B2 | 1/2017 | Abe et al. |
| 9,564,029 B2 | 2/2017 | Morrell et al. |
| 9,576,445 B2 | 2/2017 | Cruz-Hernandez |
| 9,595,659 B2 | 3/2017 | Kim |
| 9,600,070 B2 | 3/2017 | Chatterjee et al. |
| 9,608,506 B2 | 3/2017 | Degner et al. |
| 9,622,214 B2 | 4/2017 | Ryu |
| 9,640,048 B2 | 5/2017 | Hill |
| 9,652,040 B2 | 5/2017 | Martinez et al. |
| 9,659,482 B2 | 5/2017 | Yang et al. |
| 9,665,198 B2 | 5/2017 | Kies et al. |
| 9,692,286 B2 | 6/2017 | Endo et al. |
| 9,594,450 B2 | 7/2017 | Lynn et al. |
| 9,696,803 B2 | 7/2017 | Curz-Hernandez et al. |
| 9,727,157 B2 | 8/2017 | Ham et al. |
| 9,733,704 B2 | 8/2017 | Cruz-Hernandez et al. |
| 9,746,945 B2 | 8/2017 | Sheynblat et al. |
| 9,778,743 B2 | 10/2017 | Grant et al. |
| 9,779,592 B1 | 10/2017 | Hoen |
| 9,785,251 B2 | 10/2017 | Martisauskas |
| 9,823,833 B2 | 11/2017 | Grant et al. |
| 9,830,782 B2 | 11/2017 | Morrell et al. |
| 9,831,871 B2 | 11/2017 | Lee et al. |
| 9,836,123 B2 | 12/2017 | Gipson et al. |
| 9,846,484 B2 | 12/2017 | Shah |
| 9,857,872 B2 | 1/2018 | Terlizzi et al. |
| 9,870,053 B2 | 1/2018 | Modarres et al. |
| 9,886,093 B2 | 2/2018 | Moussette et al. |
| 9,891,708 B2 | 2/2018 | Cruz-Hernandez et al. |
| 9,904,393 B2 | 2/2018 | Frey et al. |
| 9,911,553 B2 | 3/2018 | Bernstein |
| 9,928,950 B2 | 3/2018 | Lubinski et al. |
| 9,934,661 B2 | 4/2018 | Hill |
| 9,970,757 B2 | 5/2018 | Das et al. |
| 9,990,099 B2 | 6/2018 | Ham et al. |
| 9,997,306 B2 | 6/2018 | Bernstein |
| 10,013,058 B2 | 7/2018 | Puskarich et al. |
| 10,032,550 B1 | 7/2018 | Zhang |
| 10,038,361 B2 | 7/2018 | Hajati et al. |
| 10,039,080 B2 | 7/2018 | Miller et al. |
| 10,061,386 B2 | 8/2018 | Frescas et al. |
| 10,062,832 B2 | 8/2018 | Caraveo et al. |
| 10,067,585 B2 | 9/2018 | Kim |
| 10,069,392 B2 | 9/2018 | Degner et al. |
| 10,108,151 B2 | 10/2018 | Cardinali et al. |
| 10,120,446 B2 | 11/2018 | Pance et al. |
| 10,126,817 B2 | 11/2018 | Morrell et al. |
| 10,127,778 B2 | 11/2018 | Hajati et al. |
| 10,133,352 B2 | 11/2018 | Lee et al. |
| 10,139,907 B2 | 11/2018 | Billington |
| 10,139,959 B2 | 11/2018 | Butler et al. |
| 10,152,116 B2 | 12/2018 | Wang et al. |
| 10,198,097 B2 | 2/2019 | Lynn et al. |
| 10,204,494 B2 | 2/2019 | Do et al. |
| 10,236,760 B2 | 3/2019 | Moussette et al. |
| 10,338,682 B2 | 7/2019 | Heubel et al. |
| 10,345,905 B2 | 7/2019 | McClure et al. |
| 10,367,950 B2 | 7/2019 | Davis et al. |
| 10,444,834 B2 | 10/2019 | Vescovi |
| 10,444,841 B2 | 10/2019 | Nakamura et al. |
| 10,459,521 B2 | 10/2019 | Puskarich |
| 10,481,692 B2 | 11/2019 | Ullrich et al. |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0119573 A1* | 6/2006 | Grant .................. G06F 3/016 345/156 |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0015560 A1 | 1/2009 | Robinson et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0291670 A1 | 11/2009 | Sennett et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0110018 A1 | 5/2010 | Faubert et al. |
| 2010/0141408 A1 | 6/2010 | Doy et al. |
| 2010/0141606 A1 | 6/2010 | Bae et al. |
| 2010/0148944 A1* | 6/2010 | Kim .................... G06F 3/016 340/407.1 |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0231508 A1 | 9/2010 | Cruz-Hernandez et al. |
| 2010/0265197 A1 | 10/2010 | Purdy |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0156539 A1 | 6/2011 | Park et al. |
| 2011/0157052 A1* | 6/2011 | Lee .................... G06F 3/016 345/173 |
| 2011/0163985 A1* | 7/2011 | Bae .................... G06F 3/016 345/173 |
| 2011/0216013 A1 | 9/2011 | Siotis |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0256848 A1 | 10/2012 | Madabusi Srinivasan |

(56) References Cited

U.S. PATENT DOCUMENTS

| | | | |
|---|---|---|---|
| 2012/0274578 A1 | 11/2012 | Snow et al. | |
| 2012/0280927 A1 | 11/2012 | Ludwig | |
| 2012/0319987 A1 | 12/2012 | Woo | |
| 2012/0327006 A1 | 12/2012 | Israr et al. | |
| 2013/0027345 A1 | 1/2013 | Binzel | |
| 2013/0033967 A1 | 2/2013 | Chuang et al. | |
| 2013/0043987 A1 | 2/2013 | Kasama et al. | |
| 2013/0058816 A1 | 3/2013 | Kim | |
| 2013/0106699 A1 | 5/2013 | Babatunde | |
| 2013/0191741 A1 | 7/2013 | Dickinson et al. | |
| 2013/0207793 A1 | 8/2013 | Weaber et al. | |
| 2013/0217491 A1 | 8/2013 | Hilbert et al. | |
| 2013/0228023 A1 | 9/2013 | Drasnin et al. | |
| 2013/0261811 A1 | 10/2013 | Yagi et al. | |
| 2013/0300590 A1 | 11/2013 | Dietz et al. | |
| 2014/0082490 A1 | 3/2014 | Jung et al. | |
| 2014/0085065 A1 | 3/2014 | Biggs et al. | |
| 2014/0097065 A1* | 4/2014 | Woiler | B65G 27/28 198/769 |
| 2014/0132528 A1 | 5/2014 | Catton | |
| 2014/0143785 A1 | 5/2014 | Mistry et al. | |
| 2014/0168153 A1 | 6/2014 | Deichmann et al. | |
| 2014/0197936 A1 | 7/2014 | Biggs et al. | |
| 2014/0232534 A1 | 8/2014 | Birnbaum et al. | |
| 2014/0267076 A1 | 9/2014 | Birnbaum et al. | |
| 2015/0005039 A1 | 1/2015 | Liu et al. | |
| 2015/0040005 A1 | 2/2015 | Faaborg | |
| 2015/0098309 A1 | 4/2015 | Adams et al. | |
| 2015/0169059 A1 | 6/2015 | Behles et al. | |
| 2015/0194165 A1 | 7/2015 | Faaborg et al. | |
| 2015/0205355 A1 | 7/2015 | Yairi | |
| 2015/0205417 A1 | 7/2015 | Yairi et al. | |
| 2015/0296480 A1 | 10/2015 | Kinsey et al. | |
| 2016/0103544 A1 | 4/2016 | Filiz et al. | |
| 2016/0162025 A1* | 6/2016 | Shah | G06F 3/016 345/156 |
| 2016/0206921 A1 | 7/2016 | Szabados et al. | |
| 2016/0216766 A1 | 7/2016 | Puskarich | |
| 2016/0241119 A1 | 8/2016 | Keeler | |
| 2016/0259480 A1 | 9/2016 | Augenbergs et al. | |
| 2016/0306423 A1 | 10/2016 | Uttermann et al. | |
| 2016/0371942 A1 | 12/2016 | Smith, IV et al. | |
| 2017/0038905 A1 | 2/2017 | Bijamov et al. | |
| 2017/0070131 A1 | 3/2017 | Degner et al. | |
| 2017/0090667 A1 | 3/2017 | Abdollahian et al. | |
| 2017/0153703 A1 | 6/2017 | Yun et al. | |
| 2017/0192508 A1 | 7/2017 | Lim et al. | |
| 2017/0242541 A1 | 8/2017 | Iuchi et al. | |
| 2017/0255295 A1 | 9/2017 | Tanemura et al. | |
| 2017/0285747 A1 | 10/2017 | Chen | |
| 2017/0311282 A1 | 10/2017 | Miller et al. | |
| 2017/0345992 A1 | 11/2017 | Noguchi | |
| 2017/0357325 A1 | 12/2017 | Yang et al. | |
| 2017/0364158 A1 | 12/2017 | Wen et al. | |
| 2018/0052550 A1 | 2/2018 | Zhang et al. | |
| 2018/0059793 A1 | 3/2018 | Hajati | |
| 2018/0060941 A1 | 3/2018 | Yang et al. | |
| 2018/0075715 A1 | 3/2018 | Morrell et al. | |
| 2018/0081441 A1 | 3/2018 | Pedder et al. | |
| 2018/0174409 A1 | 6/2018 | Hill | |
| 2018/0203513 A1 | 7/2018 | Rihn | |
| 2018/0302881 A1 | 10/2018 | Miller et al. | |
| 2019/0027674 A1 | 1/2019 | Zhang et al. | |
| 2019/0159170 A1 | 5/2019 | Miller et al. | |
| 2019/0214895 A1 | 7/2019 | Moussette et al. | |
| 2020/0026359 A1 | 1/2020 | Uttermann et al. | |
| 2020/0027320 A1 | 1/2020 | Hill | |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 102057656 | 5/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102754054 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103155410 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104049746 | 9/2014 |
| CN | 104220963 | 12/2014 |
| CN | 104917885 | 9/2015 |
| CN | 104956244 | 9/2015 |
| CN | 105556268 | 5/2016 |
| CN | 208013890 | 10/2018 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2207080 | 7/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 2006150865 | 6/2006 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |
| JP | 2013149124 | 8/2013 |
| JP | 2014002729 | 1/2014 |
| JP | 2014509028 | 4/2014 |
| JP | 2014235133 | 12/2014 |
| JP | 2014239323 | 12/2014 |
| JP | 2015153406 | 8/2015 |
| JP | 2015228214 | 12/2015 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |

(56) References Cited

FOREIGN PATENT DOCUMENTS

| TW | 200518000 | 11/2007 |
|---|---|---|
| TW | 200951944 | 12/2009 |
| TW | 201145336 | 12/2011 |
| TW | 201218039 | 5/2012 |
| TW | 201425180 | 7/2014 |
| WO | WO 97/016932 | 5/1997 |
| WO | WO 00/051190 | 8/2000 |
| WO | WO 01/059558 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169299 | 11/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 15/023670 | 2/2015 |
| WO | WO 16/141482 | 9/2016 |

OTHER PUBLICATIONS

U.S. Appl. No. 16/352,784, filed Mar. 13, 2019, Moussette et al.
Actuator definition downloaded from http://www.thefreedictionary.com/actuator on May 3, 2018, 2 pages.
Astronomer's Toolbox, "The Electromagnetic Spectrum," http://imagine.gsfc.nasa.gov/science/toolbox/emspectrum1.html, updated Mar. 2013, 4 pages.
Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
Nakamura, "A Torso Haptic Display Based on Shape Memory Alloy Actuators," Massachusetts Institute of Technology, 2003, pp. 1-123.
PuntoCellulare, "LG-GD910 3G Watch Phone," YouTube (http://www.youtube.com/watch?v+HcCl87KIELM), Jan. 8, 2009, 9 pages.
Sullivan, Mark, "This Android Wear Update Turns Your Device into the Dick Tracy Watch," Fast Company (https://www.fastcompany.com/3056319/this-android-wear-update-turns-your-device-into-the-dick-tracy-watch), Feb. 4, 2016, 9 pages.

* cited by examiner

DAMPENING MECHANICAL MODES OF A HAPTIC ACTUATOR USING A DELAY

CROSS REFERENCE TO RELATED APPLICATIONS

This application is a continuation of U.S. patent application Ser. No. 15/364,822, filed Nov. 30, 2016, entitled "Dampening Mechanical Modes of a Haptic Actuator Using a Delay," which claims priority to and the benefit under 35 U.S.C. 119(e) of U.S. Provisional Patent Application Ser. No. 62/316,477, filed Mar. 31, 2016, entitled "Dampening Mechanical Modes of a Haptic Actuator Using a Delay," and to U.S. Provisional Patent Application Ser. No. 62/326,697, filed Apr. 22, 2016, entitled "Dampening Mechanical Modes of a Haptic Actuator Using a Delay," the contents of which are incorporated by reference in their entirety as if fully disclosed herein.

FIELD

The described embodiments relate generally to haptic actuators. More specifically, the embodiments described herein are directed to dampening high order modes, such as a higher order resonance mode, of a haptic actuator that may cause a mass of the haptic actuator to impact or collide with an internal surface of the haptic actuator.

BACKGROUND

Some electronic devices use a haptic actuator to provide a haptic output to a user. The haptic output can notify the user of an incoming message, a telephone call, an upcoming event, and so on. The haptic output may include a vibration or movement that is perceived by the user.

In some cases, the haptic actuator is a linear actuator that includes a moveable mass. The moveable mass may be driven at various frequencies to provide different kinds of haptic output. For example, an electromotive force may be applied to the moveable mass which causes the moveable mass to move from a first position to a second position and back again. However, when the moveable mass is driven at regular intervals, the moveable mass may begin to exhibit unwanted movement. For example, the moveable mass may begin to excite a higher order resonance mode which causes the moveable mass to rotate about an axis, rock back and forth in a seesaw type motion, and so on. When the moveable mass moves in such a manner, the moveable mass may impact or otherwise collide with a housing of the haptic actuator thereby causing undesirable noises and possible damage to the electronic device or the haptic actuator.

SUMMARY

Described herein is a method for determining and eliminating or otherwise reducing collisions caused by higher order resonance mode frequencies in a haptic actuator for an electronic device. The higher order resonance mode frequency is a frequency in which a mass of the haptic actuator exhibits undesired movement. For example, as the mass of the haptic actuator oscillates outside of the designed resonant frequency, the mass may approach or reach a higher order resonance mode frequency which causes the mass to rotate about its axis or otherwise rock back and forth within an enclosure of the haptic actuator. The movement may cause the mass to collide or otherwise impact an enclosure of the haptic actuator.

Accordingly, the embodiments described herein are directed to determining a higher order resonance mode frequency of the haptic actuator so that steps may be taken to negate or otherwise cancel the undesired movement of the mass. The higher order resonance mode frequency may be used to determine a delay or offset that may be added to a period between a series of input waveforms. The delay or offset may cancel, suppress, or otherwise inhibit the actuator's response to the higher order resonance mode frequency. In particular, the delay or offset may result in a braking of the mass in a direction that is opposite to the undesired motion that normally occurs at the higher order resonance mode frequency.

Some embodiments described herein are directed to a method for determining a higher order resonance mode frequency of an actuator for an electronic device. In one example, a first series of input waveforms is provided to the actuator to cause the actuator to move. The first series of input waveforms has a first period. A sweep of multiple subsequent series of input waveforms is then provided to the actuator, and each subsequent series of input waveforms has a respective period that belongs to a set of monotonically incremented or decremented values with respect to the first period, but can be played in any order. One or more periods are then determined that result in an actuator mass of the actuator impacting an internal portion of the actuator. A higher order resonance mode frequency of the actuator is then determined using the identified periods.

As an alternative technique for determining the higher order resonance mode frequency, a first series of input waveforms may be provided to the actuator to cause the mass of the actuator to move. Each input waveform of the first series of input waveforms is separated by first period. A second series of input waveforms may also be provided to the actuator to cause the actuator to move. Each input waveform of the second series of input waveforms may be separated by a second period. The second period may be different than the first period. A determination is then made as to whether the first or second series causes an actuator mass of the actuator to impact at least a portion of an enclosure of the actuator. If the first or the second series causes the actuator mass to impact the enclosure, the higher order resonance mode frequency of the actuator may be estimated using the first or second periods. The estimation is made by determining a mean of a set of frequencies associated with either of the periods.

Also described is an electronic device having a processing unit, a memory, an interpreter and a haptic actuator. The memory is operative to store instructions for generating a plurality of input waveforms that drive the haptic actuator. The interpreter is operative to determine whether a delay that is provided between alternating input waveforms should be modified prior to the input waveforms being provided to the haptic actuator. The delay is operative to offset or suppress a higher order resonance mode response motion of an actuator mass of the haptic actuator.

The present disclosure also describes a method for determining a delay that is provided between input waveforms applied as input to a haptic actuator. This method includes determining a higher order resonance mode frequency of the haptic actuator, determining a period of the higher order resonance mode, and determining the delay using the higher order resonance mode frequency and the period of the higher order resonance mode.

Also disclosed is a method for determining whether a polarity inversion is needed between various input waveforms that are applied as input to a haptic actuator. This includes determining a higher order resonance mode frequency of the haptic actuator, determining a period of the higher order resonance mode, and determining the polarity of waveforms using the higher order resonance mode frequency as well as the period of the higher order resonance mode.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
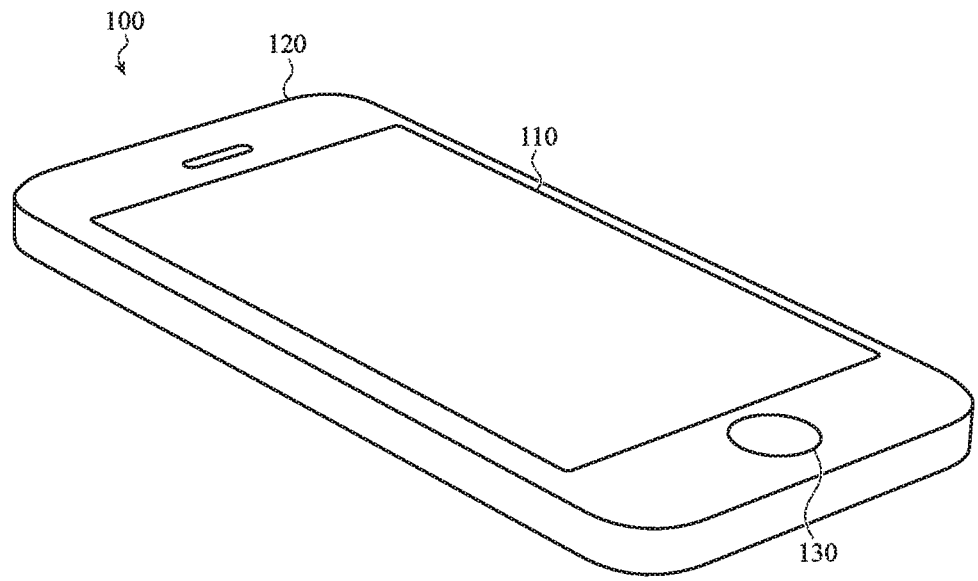
FIG. 1A illustrates an example electronic device that may utilize a method for providing a delay between input waveforms.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to dampening, suppressing, or otherwise canceling various mechanical modes of a haptic actuator. The mechanical mode to be dampened or otherwise eliminated may be a higher order resonance mode of a mass of the haptic actuator. As used herein, the term "higher order resonance mode" may be associated with an undesired movement of the mass of the haptic actuator. In some embodiments, the higher order resonance mode is associated with a frequency that causes the mass of the haptic actuator to rotate about an axis and collide or otherwise impact an internal surface of the haptic actuator.

In one example, the haptic actuator may receive one or more input waveforms as input. An input waveform may include a signal having a time-varying current, voltage, or other electrical input. Each input waveform causes the mass of the haptic actuator to move back and forth within a housing or enclosure of the haptic actuator. As the mass moves, a haptic output in the form of a vibration or other perceptible movement is provided. The haptic output that is provided may be based, at least in part, on the type of input waveform provided. For example, a first input waveform may cause the haptic actuator to provide a first haptic output and a second input waveform may cause the haptic actuator to provide a second haptic output. The haptic output may be used to notify a user of a particular event, such as, for example, an incoming telephone call, an incoming message, a calendared event, a system or application update and so on. The different haptic outputs may be perceived differently by the user and used to differentiate between events or actions associated with an electronic device.

In some embodiments, the electronic device has a predefined library of input waveforms that may be provided to the haptic actuator. The predefined library may include input waveforms that are optimized to provide a specific haptic output. Each input waveform may be associated with a predefined minimum period. The predefined minimum period may provide a safety margin between input waveforms when a series of input waveforms is combined together (e.g., played in sequence by the haptic actuator). The predetermined minimum period helps prevent residual motion from cascading to a subsequent input waveform which could result in excessive mass excitation and cause the mass to impact a housing of the haptic actuator.

In other embodiments, a user may design or otherwise specify one or more input waveforms that are provided to the haptic actuator. In such embodiments, each user-specified input waveform, or series of input waveforms, may have a predefined minimum period.

However, as the haptic actuator receives and plays the various input waveforms, the mass may begin to enter a higher order resonance mode due to off-axis motion of the moving mass. For example, a higher order resonance mode may be created due to the presence of torsional springs or other mechanical elements of the haptic actuator that may impart angular movement to the moving mass while the designed resonance mode causes the moving mass to travel along its transverse axis.

In response to a regularly repeating series of input waveforms, a higher order resonance mode may develop causing the mass to rotate about an axis. The mass may exhibit a seesaw motion, rock back and forth, or exhibit another induced rotational motion. As the mass moves in this manner, it may impact or collide with an enclosure or internal surface of the haptic actuator and/or a housing of the electronic device. When the mass impacts the enclosure, an undesired audible "click" sound may be produced. In addition to producing unwanted sounds, the higher order resonance mode may cause damage the actuator, the actuator mass and/or the electronic device.

In order to prevent or reduce unwanted movement within the haptic actuator, the embodiments described herein are directed to inserting a delay or otherwise modifying a period that is provided between one or more pairs of input waveforms. In some embodiments, the period that is modified or the delay that is inserted is provided between every other input waveform. As the embodiments described herein encompass both a modified period and an inserted or additional delay, the generic term "delay" as used herein encompasses both embodiments.

The delay may be based, at least in part, on the frequency of the undesirable higher order resonance mode of the mass of the actuator. As such, the embodiments described herein may be used across various haptic actuators. Another additional advantage is that the delay can be used to reduce the higher order resonance mode without changing the input waveform or mechanical aspects of the haptic actuator. Thus, the input waveform and/or mechanical aspects of the haptic actuator may be optimized for criteria other than the higher order resonance mode, which may be corrected with a delay.

In some embodiments, the delay is calculated such that a subsequent input waveform cancels, brakes, or otherwise suppresses a motion associated with the higher order resonance mode frequency of the haptic actuator, such as a rolling motion. In some implementations, the electronic device includes an interpreter that determines the delay that is provided between selected input waveforms. For example, the interpreter may apply a delay to at least one input waveform in a series of input waveforms (separated by an input waveform period) to cancel, attenuate, or otherwise brake the higher order resonance mode. The addition of the delay prevents and/or mitigates the accumulation of energy at the higher order resonance mode frequency from one input waveform to the next. Typically the delay is applied to a subsequent input waveform, although this may not be required of all embodiments. The length of an applied delay may be selected such that those frequency components of the delayed input waveform that are approximately at the higher order resonance mode frequency are 180 degrees out of phase with the same frequency components of the previous input waveform. As a result, the out-of-phase frequency components cancel, and the accumulation of energy at the higher order resonance mode frequency is abated. The interpreter may identify or calculate the delay for any number of input waveforms including those that are preprogramed or otherwise stored in a library of the electronic device and those that may be specified by the user.

In additional and/or alternative embodiments, the various delays may be arranged in a binary hierarchy such that various groups of input waveforms have different delays that cancel or negate various higher order resonance mode frequencies or a range of frequencies. For example, a first delay may be provided to a first group of input waveforms, a second delay may be provided to a second group of input waveforms, while a third delay may be provided to a third group of input waveforms. A single type of input waveform, or an individual input waveform, can belong to multiple groups. As such, its total delay may be the sum of the delays from its membership in each of the groups. In some cases, the binary hierarchy of delays results in a suppression of a range of frequencies at or around a higher order resonance mode frequency, which may increase the robustness of the suppression of undesired higher modes. The range of frequencies may also allow for natural or predicable variations in the haptic actuator over time, which may cause the higher order resonance mode of the actuator to shift over time with repeated use.

In some implementations, the polarities of every second input waveform are flipped to cancel energy coupled to one or more higher order resonance mode responses.

These and other embodiments are discussed below with reference to FIGS. 1A-8. However, those skilled in the art will readily appreciate that the detailed description given herein with respect to these Figures is for explanatory purposes only and should not be construed as limiting.

FIG. 1A illustrates an example electronic device 100 that may use or incorporate a haptic actuator that provides haptic output. The haptic actuator may be similar to the haptic actuator 200 shown in FIG. 2. The haptic actuator may be used to provide a haptic output to a user of the electronic device 100. The haptic output may include a vibration or other motion that is tactically perceived by a user touching the electronic device 100.

Figure 1B:
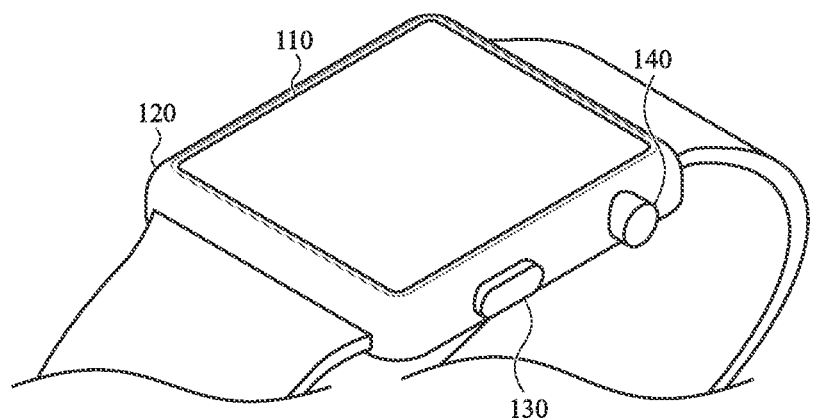
FIG. 1B illustrates another example electronic device that may utilize the method for providing a delay between input waveforms.

As shown in FIG. 1A, the electronic device 100 may be a mobile telephone although other electronic devices are contemplated. For example, and as shown in FIG. 1B, the electronic device 100 may be a wearable electronic device. In yet other embodiments, the electronic device 100 may be a laptop computer, a remote control device, a portable music player, a tablet computing device and so on.

The electronic device 100 may include a display 110 that is surrounded by, partially surrounded by, or contained within a housing 120. The display 110 of the electronic device 100 may function as both an input device and an output device. For example, the display 110 may output images, graphics, text, and the like to a user. The display 110 may also act as a touch input device that detects and measures a location of touch input on the display 110. The electronic device 100 may also include one or more force sensors that detect and/or measure an amount of force exerted on the display 110.

The electronic device 100 may also include an input component 130. The input component 130 enables a user to provide additional input to the electronic device 100. The input component 130 may be a button, a switch, a dial, a key, and so on. In some embodiments, and as shown in FIG. 1B, the electronic device 100 may include two different input components. For example a first input component 130 may be a button while the second input component 140 is a rotatable crown. In some embodiments, as each input component is actuated, the haptic actuator may provide haptic output to a user.

As briefly described above, the electronic device 100 may include a haptic actuator. The haptic output may be provided to notify a user of a particular event. In some examples, the event may be an incoming telephone call, an incoming electronic message, an exercise notification, a calendar event and so on. In other examples, a haptic output may be provided in response to a received input.

For example, when the input component 130 is actuated, a first type of haptic output may be provided by the haptic actuator. Likewise, when the second input component 140 is actuated, a second type of haptic output may be provided. In yet another example, when a force and/or a touch input is provided on the display 110 of the electronic device 100 another type of haptic output may be provided to the user.

In order to provide the various types of haptic output described, a processor of the electronic device 100 provides input to the haptic actuator in the form of one or more input waveforms. As described above, each input waveform may be associated with a particular type of haptic output. However, as the mass of the haptic actuator moves in response to the received input waveform, the mass may approach or reach its higher order resonance mode frequency. The haptic actuator may be particularly susceptible to a higher order resonance mode when a series of haptic outputs are produced at a regularly repeating interval. As discussed above, the higher order resonance mode frequency may cause the mass to exhibit undesired movement resulting in an audible sound or "click."

In order to cancel or otherwise suppress the higher order resonance mode of the mass, an interpreter associated with the electronic device 100 may analyze the input waveforms and determine an amount of delay (e.g., a predetermined delay) that is to be provided between the various input waveforms, based on the type and/or the amount of input waveforms. The interpreter then determines whether the delays are to be adjusted. For example, the interpreter may determine whether a modification is to be made to the predetermined or existing delay, whether a new delay is to be calculated, appended to the predetermined delay or otherwise inserted between the input waveforms, or whether the predetermined delay is to be replaced with a new delay. If so, the adjusted delays may be provided between selected pairs of input waveforms. The adjusted delay causes a phase shift of the input waveform. In particular, the length of a delay applied may be selected such that the frequency components of the delayed input waveform that are approximately equal to or at the higher order resonance mode frequency are 180 degrees out of phase with the same frequency components of the previous input waveform. As a result, the out-of-phase frequency components cancel, and the accumulation of energy at the higher order resonance mode frequency may be reduced, suppressed, or canceled.

Figure 2:
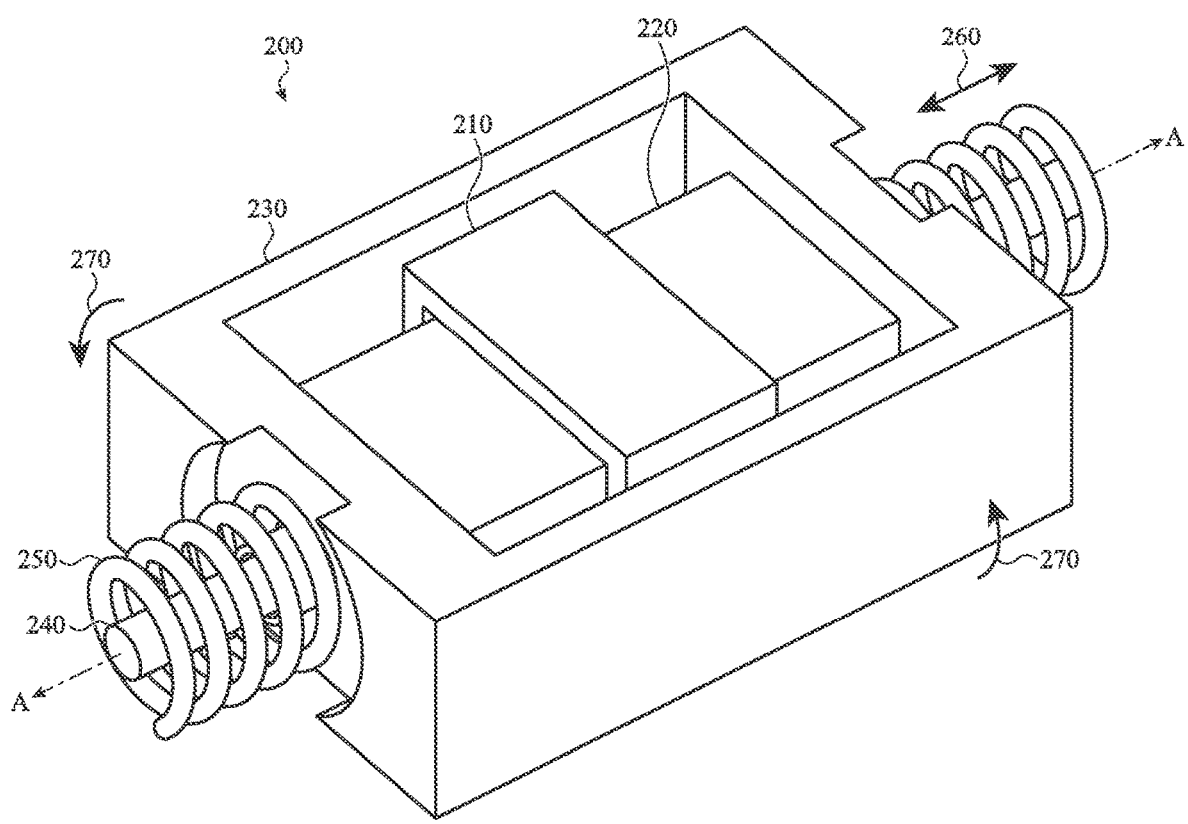
FIG. 2 illustrates an example haptic actuator that receives various input waveforms for providing haptic output.

FIG. 2 illustrates a perspective view of a haptic actuator 200. The haptic actuator 200 may be used to provide haptic output to a user of an electronic device, such as, for example, the electronic device 100 shown above with respect to FIGS. 1A-1B. Although not shown, the haptic actuator 200 may include a case or a housing that encloses or otherwise surrounds the components of the haptic actuator 200.

In some embodiments, the haptic actuator 200 is a linear actuator although the methods described herein may be used with various other types of haptic actuators. The haptic actuator 200 may include a coil 210 that encircles a mass 220. In some embodiments, the mass 220 is a magnet array. The haptic actuator 200 may also include a frame 230. The frame 230 may be part of the mass 220 but this is not required.

The mass 220 moves in response to a current associated with a received input waveform. More specifically, the coil 210 may be energized by transmitting a current associated with the input waveform along the length of a wire forming the coil 210.

When the coil 210 is energized, the mass 220 slides along a shaft 240 in one direction, or in the opposite direction (shown by arrow 260), depending on the polarity of the magnetic field emanating from the coil 210. For example, the direction of the current flow received by the coil 210 determines the direction of the magnetic flux emanating from the coil 210. The magnetic flux interacts with the mass 220 and causes the mass 220 to move back and forth along the shaft 240.

However, as the mass 220 moves along the shaft 240, it may begin to rotate (illustrated by arrows 270) about its axis (shown by lines A-A). FIG. 2 depicts an example rolling motion (illustrated by arrows 270); however other rotational motion (e.g., rocking, pitching, and yaw-rotation) may also occur.

The harmonics of the transversal mode of the haptic actuator 200 may be associated with or otherwise coupled to the higher order resonance mode of the haptic actuator 200 that causes the mass 220 to rock or otherwise exhibit undesired movement. In some cases, the resonant frequency of the mass 220 may be close to, or otherwise overlap, its higher order resonance mode frequency. For example, in some embodiments, the resonant frequency of the mass 220 may be approximately 160 Hz. However, the resonant frequency of a higher order resonance mode of mass 220 may be approximately 170 Hz to approximately 190 Hz.

In some implementations, the rotation of the mass 220 may be caused by contact with the springs 250 or other elements of the actuator 200. In some embodiments, the spring mechanisms 250 may be beehive springs although other spring mechanisms are contemplated. The beehive or coil springs may induce a small rotational motion in response to compression and release. As the mass 220 contacts the spring mechanisms 250 in a repeated fashion, the small rotation may build into a larger rotational or rolling movement, particularly if the contact is repeated at a particular frequency. The rotation of the mass 220 may also be caused by an imbalance in the system, such as an unbalanced mass, off-center bearing, or other asymmetry.

Regardless of the cause, as the mass 220 moves in response to a series of input waveforms, the mass 220 may begin to rotate about the shaft 240. As it rotates, the mass 220 may contact an interior surface of the actuator 200 including, for example, a surface of the enclosure or housing of the haptic actuator 200. If the mass 220 contacts an interior surface, it may cause an undesired audible output, such as a click noise. The contact may also damage the mass 220 and/or other components of the haptic actuator 200.

Alternating Phase Shift

Figure 3A:
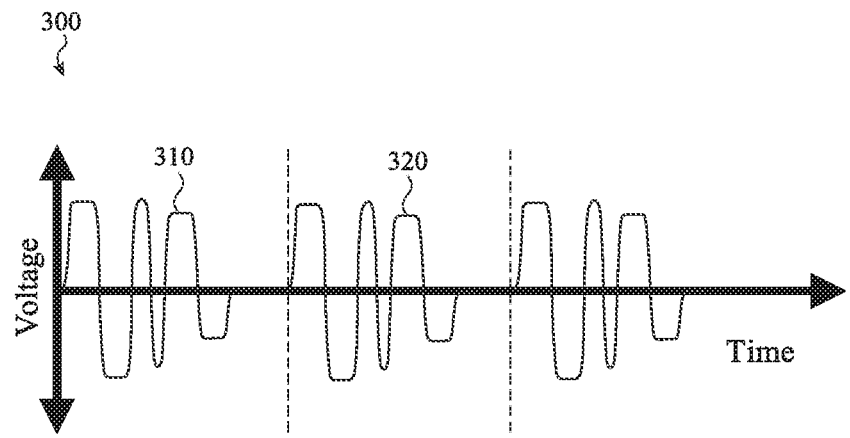
FIG. 3A illustrates an example series of input waveforms that may cause the haptic actuator of FIG. 2 to excite a higher order resonance mode.

For example and as shown in FIG. 3A, a series of input waveforms 300 may be provided to a haptic actuator (e.g., haptic actuator 200). Each input waveform may cause the haptic actuator to produce a specific type of haptic output.

In addition, each of the input waveforms 300 may be associated with a particular period (represented by the dotted vertical line). For example, a first input waveform 310 may have a first period; the second input waveform 320 may have a second period, and so on. In some embodiments, the first period is equivalent to the second period. As each input waveform in the series of input waveforms 300 is provided to the haptic actuator, lateral motion of the mass of the haptic actuator is induced. As more input waveforms are provided to the haptic actuator, a rolling motion of the mass may begin to develop.

Figure 3B:
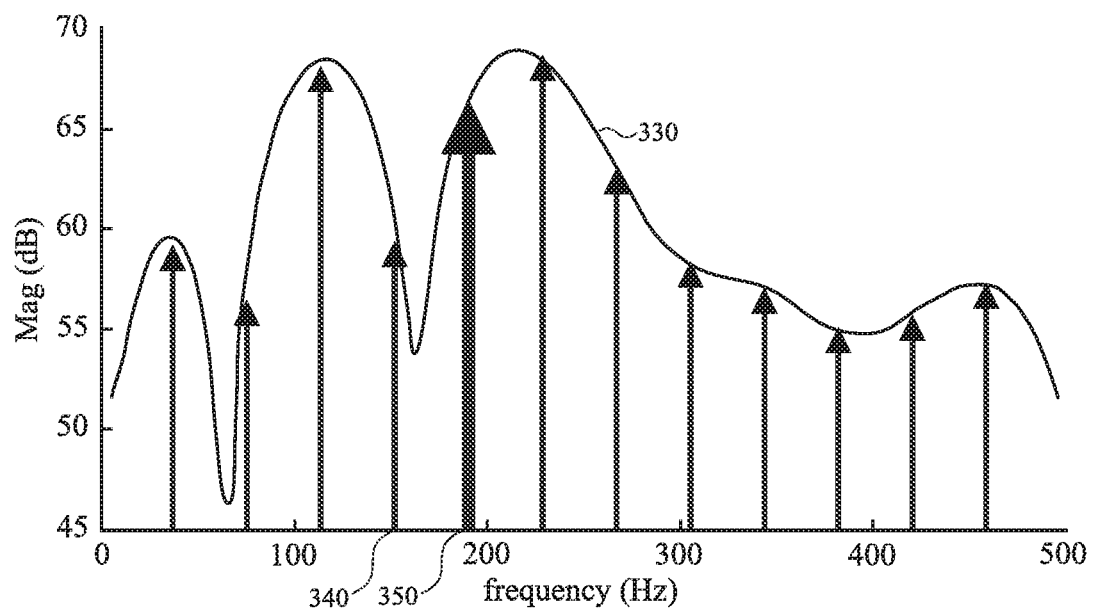
FIG. 3B illustrates an example frequency domain representation of the series of input waveforms of FIG. 3A.

For example, FIG. 3B illustrates a continuous frequency domain representation 330 of the input waveforms of FIG. 3A. In this example, various frequency components of an input waveform (e.g., first input waveform 310 and second input waveform 320 of FIG. 3A) are represented by the arrows 340. As shown, the various frequency components of the input waveforms may encompass or otherwise coincide with a higher order resonance mode frequency response (represented by arrow 350) of the haptic actuator. As such, as the mass of the haptic actuator is driven by the input waveform at or near the higher order resonance mode frequency, it may also begin to exhibit undesired vibrations at or near the higher order resonance mode frequency.

In order to cancel, brake or otherwise suppress the higher order resonance mode response, an interpreter associated with the haptic actuator 200 may insert a delay (or modify an existing delay) between the various input waveforms. The insertion of the delay may be done automatically. The delay may cause a subsequent input waveform, relative to a previous input waveform, to have respective frequency components that are phase shifted by approximately 180 degrees for those frequencies at or near the higher order resonance mode frequency. In some implementations, the delay may effectively create a band-stop filter to attenuate the higher order resonance mode frequency of the mass 220.

Figure 4A:
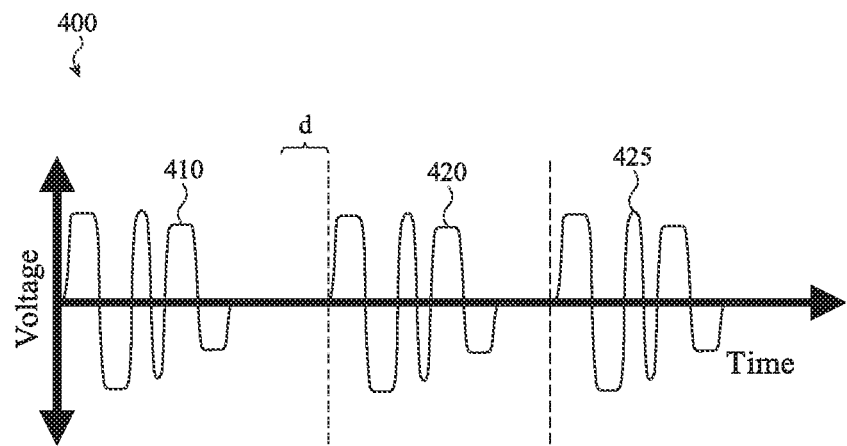
FIG. 4A illustrates an example series of input waveforms in which every other input waveform includes a modified delay.

FIG. 4A illustrates a series of input waveforms 400 in which a delay has been added and/or modified between every other input waveform. For example, a period between a first input waveform 410 and the second input waveform 420 can have an added delay d. A subsequent period between a second input waveform 420 and a subsequent third input waveform 425 may not have an additional or modified delay. The delay d may cause the second input waveform 420 to have, for one or more frequencies at or near the higher order resonance mode frequency, frequency components that are phase shifted with respect to the first input waveform 410, which may reduce energy introduced at the higher order resonance mode frequency by the first input waveform 410. In some cases, the phase shift effectively cancels or suppresses the higher order resonance mode. As will be described in more detail below, the delay may be calculated by an interpreter or other component of the electronic device.

Although a delay has been added, the length of the delay may not be perceptible by the user. For example, a user may not be able to perceive a difference between a series of input waveforms in which no delay has been added and a series of input waveforms in which a delay has been added.

Figure 4B:
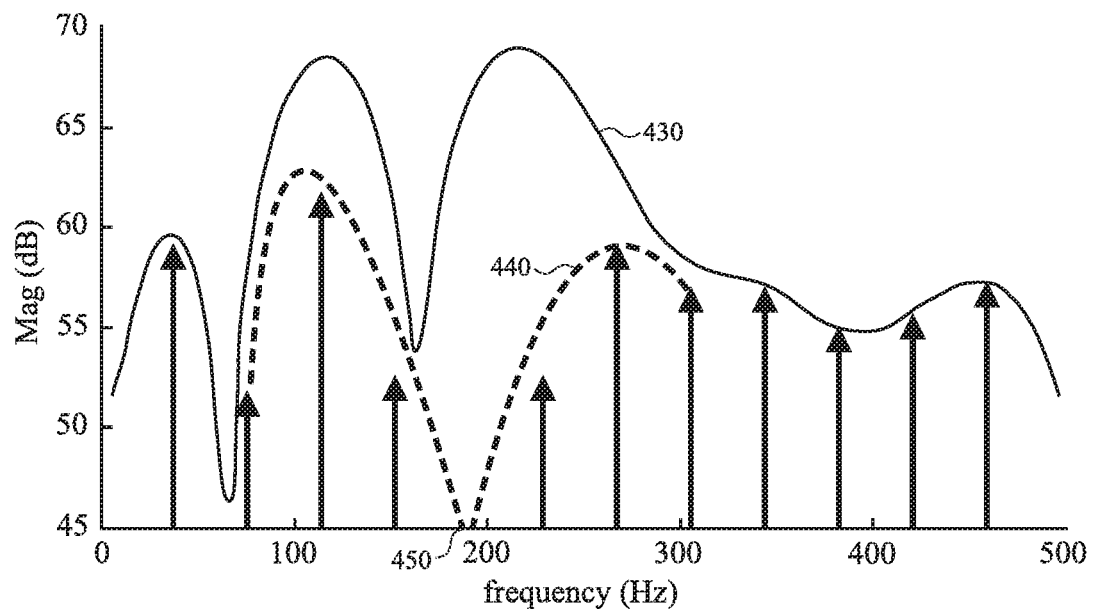
FIG. 4B illustrates an example frequency domain representation of the series of input waveforms of FIG. 4A.

Turning to FIG. 4B, which illustrates an example frequency domain representation 440 of the series of input waveforms of FIG. 4A, the delay acts as a band stop filter to cancel the higher order resonance mode of the haptic actuator. Compared to the frequency domain representation 430 if the delays are not inserted, the notch frequency 450 is designed to coincide with the higher order resonance mode frequency (illustrated as arrow 350 in FIG. 3B).

In some embodiments, the delay may be between approximately 1 ms and approximately 5 ms. In one specific but non-limiting example, the delay may be approximately 2 ms. Although specific examples have been given, the interpreter may determine that various delays may need to be provided between different input waveforms. For example, a first delay may be provided between input waveforms of a first type while a second, different delay may be provided between input waveforms of a second type. In addition, various input waveforms may be grouped together. The interpreter may determine that various delays may need to be provided between the different groupings.

In order to determine the delay that should be provided between input waveforms, the higher order resonance mode frequency may need to be determined. In some embodiments, the higher order resonance mode frequency of the mass 220 may change over the life of the electronic device or it may be dependent on environmental conditions. For example, the higher order resonance mode frequency may change if the electronic device is dropped. In another example, the higher order resonance mode frequency of the mass 220 may change based on an ambient temperature surrounding the electronic device and/or an operating temperature of the electronic device.

Figure 5:
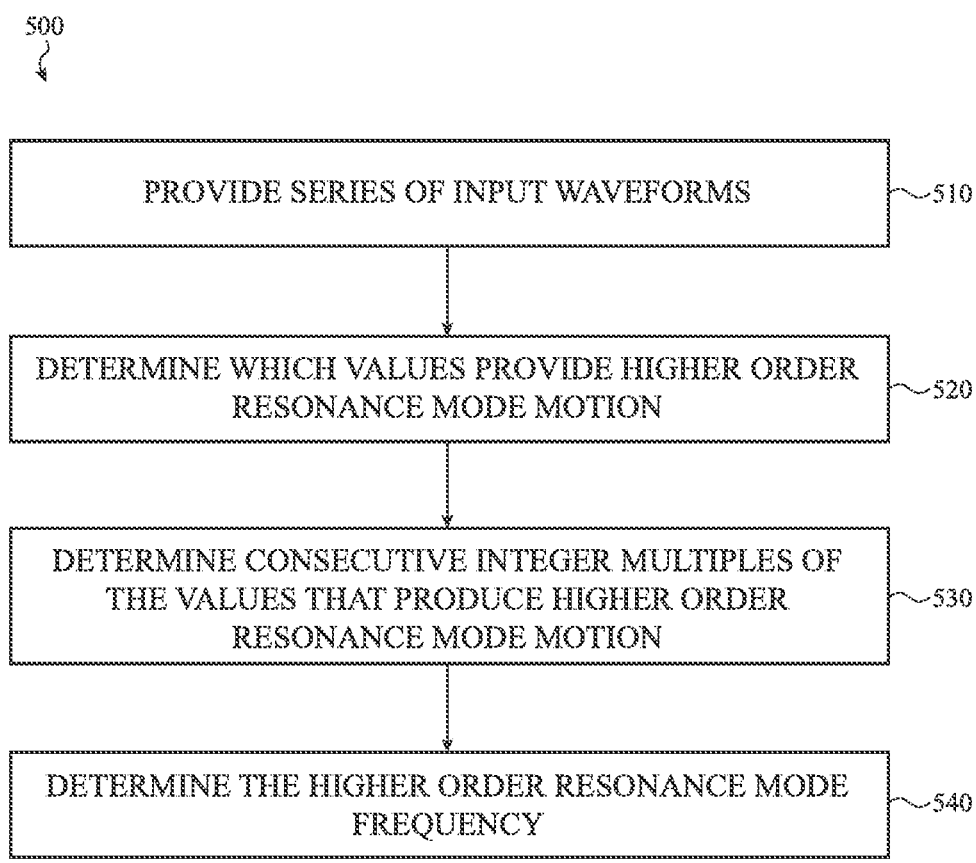
FIG. 5 illustrates a flow chart of a method for determining a higher order resonance mode frequency of a haptic actuator.

Accordingly, FIG. 5 illustrates a method 500 for determining a higher order resonance mode frequency of a haptic actuator of an electronic device. For example, the method 500 may be used to determine a higher order resonance mode frequency of a mass 220 of the haptic actuator 200 shown and described with respect to FIG. 2. Once the higher order resonance mode frequency is determined, the interpreter of the electronic device may determine the delay that is to be provided with every second input waveform to ensure the second input waveform produces energy at the higher order resonance mode frequency that is phase-shifted by approximately 180 degrees with respect to the first input waveform to counteract the energy of the first input waveform, as described above.

Method 500 begins at operation 510 in which multiple series of input waveforms are provided to the haptic actuator. The multiple series of input waveforms may provide a stepped sweep of different types of regularly repeating motion that may trigger the higher order resonance mode. For example, each series of the multiple series may have a different, fixed period between subsequent input waveforms. The input waveforms may be repeated over a time frame that is sufficient to generate a higher order resonance mode response (if one were to occur).

In one implementation, the multiple series of input waveforms include a first series of input waveforms that cause the actuator to move in accordance with a series of vibratory pulses. The input waveforms of the first series may be separated by a first period. In some embodiments, the first period may be approximately 49 ms to approximately 70 ms although other values may be used. A sweep of multiple subsequent series of waveforms may be provided, each subsequent series of input waveforms having a respective period that is incremented/decremented with respect to the first period. In some embodiments, the respective periods are incremented/decremented by approximately 1 ms to approximately 5 ms, although other values may be used.

Explained another way, in some implementations, a first series of input waveforms having a first period (e.g., 50 ms) is provided to the haptic actuator. Once the first series of input waveforms has been provided to the haptic actuator, a second series of input waveforms having a second period (e.g., 55 ms) is provided to the haptic actuator. A third series of input waveforms having a third period (e.g., 56 ms) may then be provided and so on. This may continue for various periods within the range set forth above. Although a specific range has been given, any range of periods may be used.

In operation 520, a determination is made as to which periods associated with the series of input waveforms induce a higher order resonance mode response. In some embodiments, this determination may be made by identifying whether a particular series of input waveforms having a particular period produces an audible click noise or otherwise causes a peak in an acoustic measurement. Once this determination is made, the identified periods may be stored or otherwise recorded. For purposes of this example, the identified periods may be labeled P1, P2, . . . , PN.

For example, it may be determined that the first series of input waveforms having the first period and the third series of input waveforms having the third period produce a click noise. The click noise produced by the mass may indicate that the higher order resonance mode response has been induced. Each of these periods (e.g., 55 ms and 56 ms) may then be labeled P1, P2 etc. Although the example above lists two periods that provide the click noise, any number of periods may be found and labeled accordingly.

Flow then proceeds to operation 530 in which a determination is made as to which consecutive integer multiples of the values P1, P2, etc. also induce the higher order resonance mode response (e.g., produce the noise). For example, the periods that were found to produce the higher order resonance mode response (e.g., P1, P2, . . . , PN) are converted to a frequency (e.g., 1/P1, 1/P2, . . . , 1/PN). Each of these values is then multiplied by an integer k using the following formula:

$$e = \text{range}\{(k+[0,1, \ldots, N-1])*(1/P1, 1/P2, \ldots, 1/PN)]\}$$

where the symbol "*" represents an element by element multiplication, to produce a set of harmonic frequencies. Although the above equation is specifically disclosed, other formulas may be used to determine which frequencies to test for inducing the higher order resonance mode response.

The example given above is for a sweep in which PN is monotonically increasing. However, similar equations can be used for cases where the sweep is reversed to a series of monotonically decreasing PN values. For example, [N−1, N−2, . . . , 1, 0] can be used instead of [0, 1, . . . , N−1].

In another embodiment, the periods PN may be arranged in any order so long as the same order is used when solving for the range. For example, the periods may be arranged in the following order: P3, P1, P2 where P1<P2<P3. However, this same order should be used when solving for the range using the above formula. Thus, the above formula may be represented as:

$$e = \text{range}\{(k+[2,0,1])*(1/P3,1/P1,1/P2)]\}$$

Although a specific number of periods in a specific order has been shown and described, any number of periods arranged in any order may be used.

In some embodiments, each of the values may correspond to a single frequency. In such implementations, that frequency will be the higher order resonance mode frequency of the haptic actuator.

In some embodiments, we want to find a value for k such that the range e is minimized. Accordingly, various values for k within a particular range may be used in the equation above. Once a value for k is found that minimizes the range, the mean of the various frequencies that causes the higher order resonance mode (using the k value from above) may be found. For example, the following equation may then be used to estimate the higher order resonance mode frequency of the haptic actuator:

$$\text{mean}\{(k+[0,1 \ldots N-1])*(1/P1,1/P2, \ldots ,1/PN)]\}$$

The example given here is for a sweep where PN is monotonically increasing. However, similar equations can be used for cases where the sweep is reversed to a series of monotonically decreasing PN values. For example, [N−1, N−2, . . . 1, 0] can be used instead of [0, 1, . . . , N−1]. In addition and as described above, the periods PN may be arranged in any order. After determining the periods (or, equivalently, the frequencies) to be used in a sweep, flow proceeds to stage 540.

In stage 540, a sweep of input signals with those periods is applied to the actuator. The response of the actuator to each signal can then be used to determine a frequency of a higher order resonance mode. Once the higher order resonance mode frequency of the haptic actuator has been determined a delay can then be inserted between every other input waveform (or grouping of input waveforms).

Figure 6:
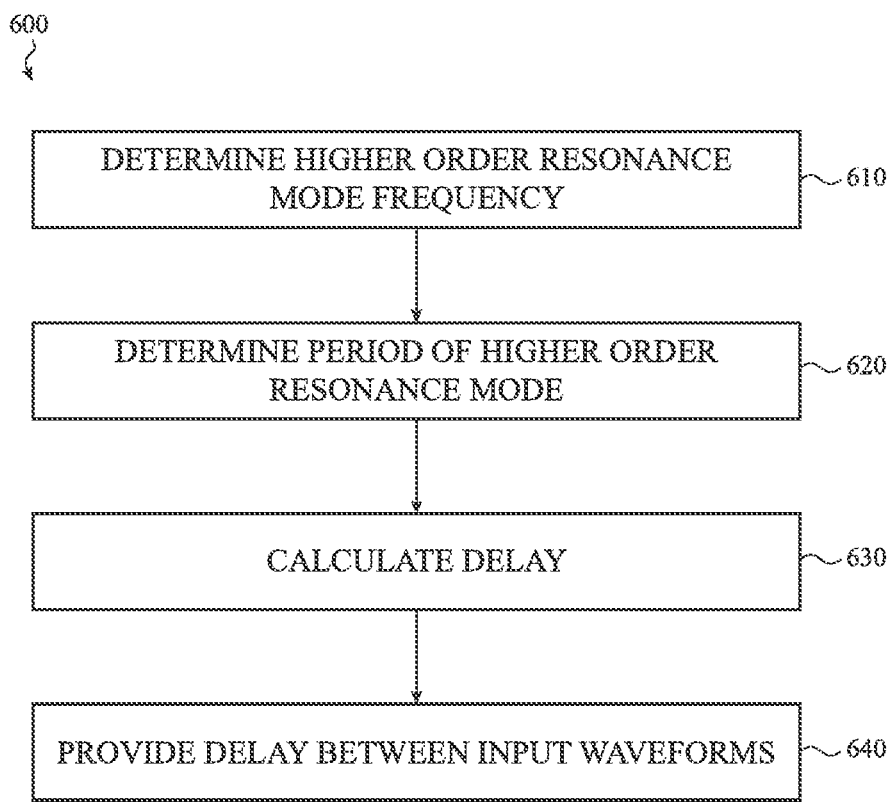
FIG. 6 illustrates a flow chart of a method for determining a delay that is interspersed between input waveforms that are applied as input to a haptic actuator.

FIG. 6 illustrates a method 600 for determining a delay that is provided between input waveforms that are applied as input to a haptic actuator. As discussed above, each input waveform may have a predetermined or predefined delay. As such, the method 600 may be used to determine whether the predefined delay is to be adjusted and, if so, by how much. The delay may be used to ensure that every other input waveform produces energy at a frequency that is phase shifted by approximately 180 degrees with respect to the higher order resonance mode frequency, which may cancel or counteract energy induced by one or more of the previous input waveforms.

Method 600 begins at operation 610 in which a higher order resonance mode frequency of a haptic actuator is determined. The higher order resonance mode frequency may be determined using method 500 described above.

In operation 620, the period of the higher order resonance mode is determined. For example, using the frequency of the higher order resonance mode, the period can be determined by $1/f_0$. Then a parameter τ may then be found using the following equation:

$$\tau = 1/(2*f_0),$$

where $f_0$ is the higher order resonance mode frequency (e.g., arrow 350 in FIG. 3B) that was determined using, for example, method 500 described above.

Once the value for τ has been determined, flow proceeds to operation 630 and the delay may be calculated. The delay, represented as d in the equation below, may then be calculated using the following equation:

$$d = \tau - \text{mod}(P, 2*\tau).$$

Once the delay is determined, flow proceeds to operation 640 and the delay is inserted into a series of input waveforms. As described above, the delay may be inserted between every other input waveform. The delay may cause a subsequent input waveform to have at least one frequency component that is phase shifted by approximately 180 degrees with respect to the higher order resonance mode frequency $f_0$. This phase shift may cancel or suppress an accumulation of energy at the higher order resonance mode frequency due to one or more previous input waveforms.

Figure 7:
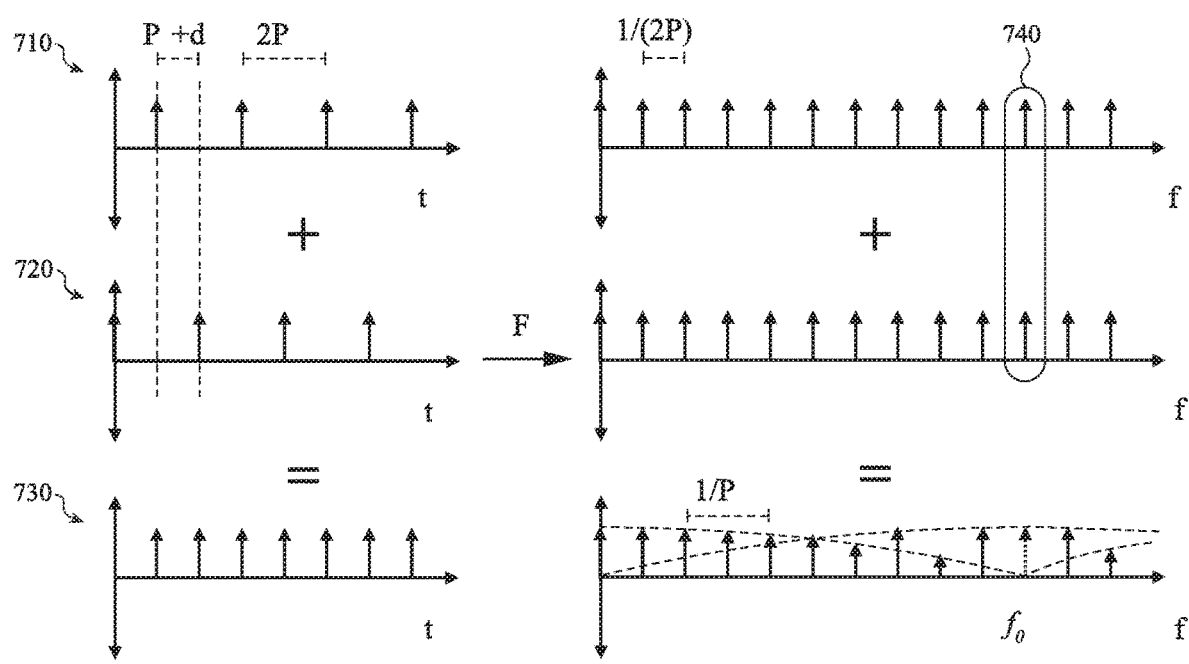
FIG. 7 illustrates how adding a delay to various input waveforms phase shifts the input waveform with respect to a subsequent input waveform thereby cancelling a higher order resonance mode frequency of a haptic actuator.

The above concept is further shown in FIG. 7 which represents a series of input waveforms as a number of arrows that are spaced apart at regular intervals. The input waveforms are separated into two different groups. For example, a first subset of input waveforms is separated into a first group 710 while a second series of input waveforms is separated into a second group 720. Each input waveform in the first group 710 includes a period P and delay d (shown as P+d). As every other input waveform is separated into a different group, each input waveform in the first group 710 is separated by 2P as shown. Likewise, each input waveform in the second group 720 is separated by 2P.

Performing a frequency domain transform, such as, for example, the Fourier transform F, on the first group 710 of input waveforms illustrates that the frequency of the first group of input waveforms is ½P. Likewise, a frequency domain transform on the second group 720 of input waveforms also shows that the frequency of the second group 720 of input waveforms has a frequency of ½P, but due to the delay d, each input waveform in the second group 720 is phase shifted in the frequency domain with respect to the first group 710 of input waveforms.

When the first group 710 of input waveforms and the second group 720 of input waveforms are combined, a third group 730 of input waveforms is formed. In the frequency domain, the delay d causes extra components in lower frequencies to be present, but a specific frequency to be canceled (e.g., the higher order resonance mode frequency labeled $f_0$ and shown by circle 740) is suppressed or effectively canceled.

In some embodiments, the delay described above may cover a single higher order resonance mode frequency or a higher order resonance mode frequency within a particular range (e.g., the delay d may effectively cancel higher order resonance mode responses at frequencies within a range of +/−4 hz of the determined higher order resonance mode frequency). However, a particular haptic actuator may have a number of higher order resonance mode frequencies, as will now be described.

Hierarchical Alternating Phase Shift

In some embodiments, various input waveforms or combinations of input waveforms may have multiple frequency components that each induces a respective higher order resonance mode response. In other cases, the frequency components may change over time, in response to an event (e.g., a drop event) and/or in response to various environmental conditions (e.g., operating temperature, ambient temperature etc.). Accordingly, the stop-band bandwidth may be increased to cover each of the instances described above by inserting respective, possibly different, delays within a sequence of input waveforms. This can effectively create a notch filter having notches (i.e., frequency nulls) at more than one higher order resonance mode frequency.

More specifically, the delays that are inserted between the input waveforms may be determined and arranged in a binary hierarchy. In general, as described below, to insert n notch frequencies, fn, there needs to be at least $2^n$ input waveforms.

As an example, for n=3, and eight waveforms, a delay in a first level of the hierarchy may be applied to every other input waveform such as described above. In some embodiments, the delay in the first level of the binary hierarchy is equivalent to the delay d calculated above. In this example, in which eight input waveforms are provided sequentially to the haptic actuator, the delay d is provided on the second, fourth, sixth and eighth input waveform (e.g., every other input waveform).

In the next level of the binary hierarchy, a second delay is added to a group of every other two consecutive input waveforms. Continuing with the example above, a second delay d2 may be added to every other group of two consecutive input waveforms. Thus, d2 is added to the third input waveform and the fourth input waveform and the seventh input waveform and the eighth input waveform.

In a third level of the binary hierarchy, a third delay may be added to a group of every other four consecutive input waveforms. Continuing with the example above, a third delay d3 may be added to the fifth, sixth, seventh and eighth input waveforms. This process may continue for any $2^n$ input waveforms that are provided to a haptic actuator. The following table further illustrates the above example binary hierarchy:

TABLE 1

| Input Waveform | Delay |
| --- | --- |
| 1 | 0 |
| 2 | d1 |
| 3 | d2 |
| 4 | d1 + d2 |
| 5 | d3 |
| 6 | d1 + d3 |
| 7 | d2 + d3 |
| 8 | d1 + d2 + d3 |

For the general case of $2^n$ input waveforms, the example above may also be represented by the following algorithm:

For n=1:N add dn to $2^{n-1}$ consecutive input waveforms starting every $2^{nth}$ input waveform.

In the above equation, each delay dn may be calculated using the following:

dn=τn−mod (n*P, 2*τn) where τn=1/(2*fn) (fn is a notch frequency of the band-stop filter).

Conditional Polarity

In additional and/or alternative embodiments, a higher order resonance mode of a haptic actuator may be suppressed or otherwise reduced by conditionally reversing every second input waveform (e.g., conditionally switching or inverting the polarities of input waveforms). For example, a first input waveform may have a first polarity while a second input waveform may have an opposite polarity. In some embodiments, a pitch of the waveform may be used to determine whether the polarities should be reversed.

In order to determine whether alternating polarities are to be used, or whether uniform polarities are to be used, an integer n is determined that minimizes an absolute value the integer n over a period P minus the higher order resonance mode frequency $f_0$. This may be represented by the following:

Find integer n that minimizes $|n/P - f_0|$

In this particular implementation, the input waveform may be associated with a particular period P and the higher order resonance mode frequency $f_0$ may be known.

Once this value is determined, a second integer m is found such that the integer m minimizes the absolute value of m plus one-half over the period P minus the higher order resonance mode frequency $f_0$. This may be represented by the following:

Find integer m that minimizes $|(m+\frac{1}{2})/P - f_0|$

Once the values have been determined, the values are compared. For example, the comparison may be represented as:

$|n/P - f_0| > |(m+\frac{1}{2})/P - f_0|$

If $|n/P - f_0|$ is greater than $|(m+\frac{1}{2})/P - f_0|$, meaning that the resulting value of the equation $|n/P - f_0|$ is farther away from the resonant frequency than the resulting value $|(m+\frac{1}{2})/P - f_0|$, the polarities of the input waveforms are not alternated. If however, $|n/P - f_0|$ is less than $|(m+\frac{1}{2})/P - f_0|$, meaning that the resulting value of $|n/P - f_0|$ is closer to the resonant frequency than the resulting value of $|(m+\frac{1}{2})/P - f_0|$, the polarities of the input waveform are alternated such as described above. The implementation described above is provided as one illustrative example and is not intended to be limiting.

Figure 8:
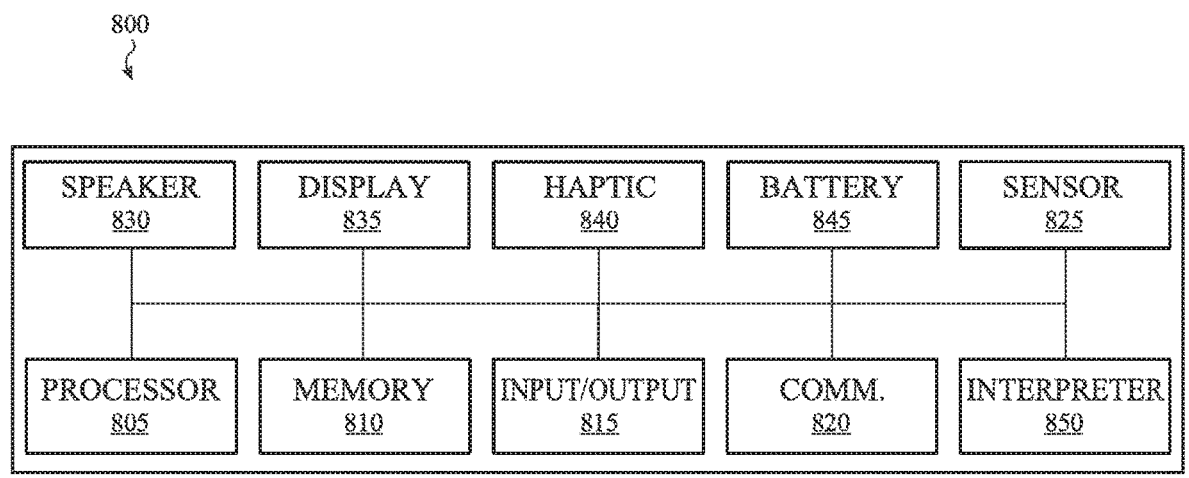
FIG. 8 illustrates example components of an electronic device that may utilize the various embodiments described herein.

FIG. 8 illustrates example components of an electronic device 800 that may use a haptic actuator to provide haptic output such as described herein. As such, the electronic device 800 may also utilize the methods described herein to determine a higher order resonance mode frequency of the haptic actuator and also calculate a delay that is to be provided to every other input waveform that is provided as input to the haptic actuator.

As shown in FIG. 8, the electronic device 800 includes at least one processor 805 or processing unit configured to access a memory 810. The memory 810 may have various instructions, computer programs, or other data stored thereon. The instructions may be configured to cause the processor 805 to perform one or more of the operations or functions described with respect to the electronic device 800. For example, the instructions may be configured to cause the processor 805 to control or coordinate the operation of the display 835, one or more input/output components 815, one or more communication channels 820, one or more sensors 825, a speaker 830, and/or one or more haptic actuators 840. In some embodiments, the memory 810 includes a library of input waveforms that is provided to the haptic actuator 840.

The processor 805 may be implemented as any electronic device capable of processing, receiving, or transmitting data or instructions. For example, the processor 805 can be a microprocessor, a central processing unit (CPU), an application-specific integrated circuit (ASIC), a digital signal processor (DSP), or combinations of such devices.

The memory 810 can store electronic data that can be used by the electronic device 800. For example, the memory 810 can store electrical data or content such as, for example, audio and video files, documents and applications, device settings and user preferences, timing and control signals or data for the various modules, data structures or databases, and so on.

The memory 810 may be any type of memory such as random access memory, read-only memory, Flash memory, removable memory, or other types of storage elements, or combinations of such devices.

The electronic device 800 may include various input and output components represented in FIG. 8 as Input/Output 815. Although the input and output components are represented as a single item, the electronic device 800 may include a number of different input components, including buttons, input surfaces, microphones, switches, rotatable crowns, dials and other input mechanisms for accepting user input. The input and output components may include one or more touch sensors and/or force sensors. For example, the display 835 may be comprised of a display stack that includes one or more touch sensors and/or one or more force sensors that enable a user to provide input to the electronic device 800.

The electronic device 800 may also include one or more communication channels 820. These communication channels 820 may include one or more wireless interfaces that provide communications between the processor 805 and an external device or other electronic device. In general, the one or more communication channels 820 may be configured to transmit and receive data and/or signals that may be interpreted by instructions executed on the processor 805. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

The electronic device 800 may also include one or more sensors 825. Although a single representation of a sensor 825 is shown in FIG. 8, the electronic device 800 may have many sensors. These sensors may include resistive sensors, light sensors, capacitive sensors, biometric sensors, temperature sensors, accelerometers, gyroscopes, barometric sensors, moisture sensors, and so on.

One or more acoustic modules or speakers 830 may also be included in the electronic device 800. The speaker 830 may be configured to produce an audible sound or an acoustic signal.

As also shown in FIG. 8, the electronic device 800 may include a haptic actuator 840. The haptic actuator 840 may be any type of haptic actuator such as, for example, the haptic actuator shown and described above with respect to FIG. 2. In other embodiments, the haptic actuator 840 may be any type of rotational haptic device, linear haptic actuator, piezoelectric devices, vibration elements, and so on. The haptic actuator 840 is configured to receive one or more input waveforms such as described above and, as a result, provide punctuated and distinct feedback to a user of the electronic device 800.

The electronic device 800 may also include an internal battery 845. The internal battery 845 may be used to store and provide power to the various components and modules of the electronic device 800 including the haptic actuator 840. The battery 845 may be configured to be charged using a wireless charging system although a wired charging system may also be used.

The electronic device 800 also includes an interpreter 850. The interpreter may be a software block that receives one or more input waveforms and determines a delay that is provided between each input waveform. The interpreter may then adjust these delays using the methods described above. The input waveforms may then be provided to the haptic actuator 840.

In other embodiments, the interpreter 850 is part of the system stack or is part of the firmware of the electronic device 800. In yet other embodiments, the interpreter 850 may be integrated with a remote computing device (e.g., desktop computer, server computer, etc.). The remote computing device may be configured to provide the determined delay to the electronic device 800.

In yet another embodiment, the interpreter 850 may be a hardware timer (e.g., integrated with a driver chip) that imposes a time limit in which input waveforms cannot be provided to the haptic actuator 840.

In yet another embodiment, the interpreter 850 may be omitted or may otherwise take the form of a lookup table. Accordingly, when the higher order resonance mode frequency is determined, the lookup table may have various delays that are to be added between the input waveforms.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The invention claimed is:

1. An electronic device, comprising:
an enclosure;
a haptic actuator mounted within the enclosure and comprising a movable mass; and
a processor configured to apply a series of input waveforms to the haptic actuator,
wherein:
the applied series of input waveforms moves the movable mass to provide a haptic output;
the processor applies a first input waveform, a second input waveform, and a third input waveform in the series of input waveforms with a first delay between the first input waveform and the second input waveform, and a second delay, different from the first delay, between the second input waveform and the third input waveform; and
the processor configures the first and second delays to prevent the movable mass from contacting the enclosure.

2. The electronic device of claim 1, wherein the first and second delays prevent the movable mass from contacting the enclosure by suppressing a motion of the movable mass associated with a higher order resonance mode, the higher order resonance mode distinct from a designed resonance mode of the movable mass.

3. The electronic device of claim 2, wherein the motion of the movable mass according to the designed resonance mode is along an axis, and the motion of the movable mass associated with the higher order resonance mode is a rotational motion about the axis.

4. The electronic device of claim 2, wherein the first delay causes a frequency component of the second input waveform at a frequency of the higher order resonance mode to suppress a frequency component of the first input waveform at the frequency of the higher order resonance mode.

5. The electronic device of claim 1, wherein each input waveform in the series of input waveforms occurs during a respective period, each period having a same duration and occurring sequentially.

6. The electronic device of claim 5, wherein the first delay occurs at a beginning of the respective period of the second input waveform.

7. The electronic device of claim 6, wherein the first delay is applied between every other input waveform in the series of input waveforms.

8. The electronic device of claim 1, wherein the first and second input waveforms are selected by the processor from a predefined library stored in a memory of the electronic device.

9. An electronic device, comprising:
a housing;
a haptic actuator mounted within the housing and comprising a mass; and
a processor configured to apply a series of input waveforms to the haptic actuator, wherein:
the applied series of input waveforms moves the mass along an axis to provide a haptic output;
the applied series of input waveforms comprises a first input waveform; a delay period, after the first input waveform, in which the haptic actuator is not driven; and a second input waveform applied after the delay period; and
the processor configures the delay period to prevent the mass from contacting the housing of the electronic device.

10. The electronic device of claim 9, wherein:
the applied series of input waveforms moves the mass according to a designed resonance mode, and
the processor is configured to determine the series of input waveforms by:
receiving at least one frequency corresponding to at least one higher order resonance mode of the haptic actuator; and
determining the delay period so that the series of input waveforms has a frequency response having at least one frequency null at the at least one frequency.

11. The electronic device of claim 10, wherein:
the haptic actuator further comprises a spring connected between the housing and the mass;
the spring induces the rotational movement of the mass about the axis at the at least one higher order resonance mode; and
the delay period suppresses the rotational movement of the mass about the axis at the at least one higher order resonance mode.

12. The electronic device of claim 10, wherein:
the processor is configured to determine the series of input waveforms by:
receiving multiple frequencies corresponding to multiple higher order resonance modes of the haptic actuator; and
determining multiple delay periods to be inserted within the series of input waveforms so that the series of input waveforms has a frequency response having frequency nulls at the multiple frequencies corresponding to the multiple higher order resonance modes of the haptic actuator.

13. The electronic device of claim 12, wherein the multiple delay periods are determined according to a binary hierarchy.

14. A method of operating a haptic actuator within an electronic device, the method comprising:
determining a first delay based, at least in part, on a first higher order resonance mode of the haptic actuator;
determining a second delay based, at least in part, on a second higher order resonance mode of the haptic actuator; and
sequentially applying a first, second, third, and fourth input waveform to the haptic actuator during respective first, second, third, and fourth sequential time periods to cause a mass of the haptic actuator to move according to a designed resonance mode and provide a haptic output,
wherein:
the designed resonance mode is distinct from the first and second higher order resonance modes;
the first delay is inserted at a beginning of the second time period before the second input waveform;
the second delay is inserted at a beginning of the third time period before the third input waveform;
the first delay and the second delay are inserted at a beginning of the fourth time period before the fourth input waveform; and
the first delay and the second delay suppress motions of the mass according to the first higher order resonance mode and the second higher order resonance mode.

15. The method of claim 14, wherein the first, second, third, and fourth sequential time periods have a same duration.

16. The method of claim 14, wherein the first and second delays are determined so that respective frequency components of the first, second, third, and fourth input waveforms combine to produce a first frequency null at a first frequency associated with the first higher order resonance mode and combine to produce a second frequency null at a second frequency associated with the second higher order resonance mode.

17. The method of claim 16, further comprising:
determining a change in at least one of the first frequency associated with the first higher order resonance mode and the second frequency associated with the second higher order resonance mode;
determining an updated first delay and an updated second delay using the determined change; and
repeating the sequential application of the first, second, third, and fourth input waveforms to the haptic actuator using the updated first delay instead of the first delay and using the updated second delay instead of the second delay.

18. The method of claim 14, further comprising selecting the first, second, third, and fourth input waveforms based on the haptic output.

* * * * *